(12) United States Patent
Feger et al.

(10) Patent No.: US 7,412,134 B2
(45) Date of Patent: Aug. 12, 2008

(54) APPARATUS AND METHODS FOR REMAKEABLE CONNECTIONS TO OPTICAL WAVEGUIDES

(75) Inventors: Claudius Feger, Poughkeepsie, NY (US); Philip C. D. Hobbs, Briarcliff Manor, NY (US); Maurice McGlashan-Powell, Mount Vernon, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/540,268

(22) Filed: Sep. 30, 2006

(65) Prior Publication Data

US 2007/0025669 A1 Feb. 1, 2007

Related U.S. Application Data

(62) Division of application No. 10/315,766, filed on Dec. 10, 2002, now Pat. No. 7,116,865.

(51) Int. Cl.
*G02B 6/34* (2006.01)

(52) U.S. Cl. ............................... 385/37; 385/25; 385/27; 385/30; 385/28

(58) Field of Classification Search .................. 385/20, 385/28, 30
See application file for complete search history.

(56) References Cited

U.S. PATENT DOCUMENTS

| 6,088,495 | A * | 7/2000 | Vorobeichik et al. ........... 385/28 |
| 6,229,827 | B1 * | 5/2001 | Fernald et al. ................. 372/20 |
| 6,968,103 | B1 * | 11/2005 | Schroll et al. .................. 385/30 |
| 7,142,748 | B1 * | 11/2006 | Yang ............................ 385/30 |
| 2001/0051019 | A1 | 12/2001 | Bailey et al. |
| 2003/0012503 | A1 * | 1/2003 | Tseng et al. ................... 385/39 |
| 2004/0156403 | A1 | 8/2004 | Carter |

* cited by examiner

*Primary Examiner*—Frank G Font
*Assistant Examiner*—Eric Wong
(74) *Attorney, Agent, or Firm*—Daniel P. Morris; David Aker (57) ABSTRACT

A single-mode optical waveguide with a core, surrounded by a cladding consisting of an inner soft layer and an outer harder layer is described. The outer layer has a grating structure on its inner surface, whose spatial frequency is the same as that of the guided mode. The thickness of the inner cladding is sufficient to keep the grating outside the mode field in undeformed regions of the waveguide, so that normally no outcoupling of the light results. Connections are made by crossing two such waveguides at an angle and pressing them together. This results in deformation of the two waveguides such that the gratings are brought into proximity with the cores. Light is coupled out of one waveguide and into the other in the deformed region, resulting in a self-aligning optical connection. The out-coupled light propagates normal to the waveguide axis, so errors in the crossing angle cause little change in efficiency. Because the cladding system is sufficiently resilient to recover after deformation, the connection is remakeable.

10 Claims, 7 Drawing Sheets

APPARATUS AND METHODS FOR REMAKEABLE CONNECTIONS TO OPTICAL WAVEGUIDES

This application is a divisional application of application Ser. No. 10/315,766, filed on Dec. 10, 2002, now U.S. Pat. No. 7,116,865.

FIELD OF THE INVENTION

This invention relates to optical information transmission. More specifically it relates to apparatus and methods for providing remakeable connections for single-mode optical waveguides.

BACKGROUND OF THE INVENTION

Metal transmission lines are an increasingly serious bottleneck to the operation of computers, switch-routers, and other information handling systems. The speed of processors and logic has been increasing much faster than the available wiring bandwidth, resulting in unfavorable tradeoffs of power consumption, complexity, and transmission speed. Hence there is increasing interest in using optical interconnection between boards in computers, and even between chips on a board or a multi-chip module (MCM).

Guided-wave optics replaces electrical conduction in wires, with light propagating in dielectric optical waveguides. A dielectric guide is typically a cylindrical structure (often, not necessarily, circular), made up of annular layers. The innermost cylinder is the core, and is surrounded by one or more cladding layers, having refractive indices that are lower than that of the core. Within certain ranges of frequency, position, and angle, light traveling axially in such a structure is guided, that is, it shows no tendency to spread out radially with distance as ordinary light beams do. There is always at least one guided mode in any structure where the core index exceeds the cladding index (two, if polarization is taken into account). A waveguide in which only one such mode can propagate at a given frequency is called a single-mode waveguide. Depending on the waveguide dimensions and refractive indices, there may be other modes as well, in which case the guide is said to be a multimode waveguide.

The optical mode field falls off exponentially with radial distance in the cladding region, and its decay constant depends on the difference between the core and cladding refractive indices. In order to allow the core to be relatively large (several wavelengths in diameter) and reduce losses due to roughness and index non-uniformity at the core-cladding boundary, the core and cladding indices are usually chosen to be close to each other (1%-5% difference), which makes the decay constant in the cladding region a very sensitive function of the index difference. These guided-wave optical devices have many applications, of which the most important is long-haul fiber optic communication.

Modulated optical beams travel almost exactly the same way as unmodulated ones, regardless of how fast the modulation is; there is no tendency for higher modulation frequencies to be lost, in sharp contrast with the high frequencies in a metal wired connection. Guided wave optics is thus a natural candidate for such connections, but the set of requirements inside a computer are quite different from those that are familiar from long-haul communications. The hardware required is different as well. Inside the computer, many parallel connections are needed, each with a single unidirectional data stream coming from one modulated source per line to one detector per line. There are also important applications for one-to-many connections, where one source drives many inputs. These sources and detectors must be inexpensive, because there are so many required (hundreds for a typical server processor board) On the other hand, the very low loss of fibers (0.15-0.5 dB/km) is unnecessary, and no wavelength-division multiplexing is required. Thus, optical interconnections inside computers are likely to rely on polymer waveguides arranged in ribbons, and mass-produced especially for the purpose.

Furthermore, these parallel connections must be remakeable, so that the board can be unplugged for service and a spare plugged in, without requiring that the optical links be replaced. Multimode waveguides and fibers are currently the most common, since their comparatively large cores allow them to be spliced and coupled with loose mechanical tolerances compared to those of ordinary single-mode fibers, as used in telecommunications. Loose tolerances translate into low cost and usually into mechanical robustness as well.

Single-mode waveguides have significant advantages over multimode waveguides, especially in their small diameter and the resulting high interconnection density. Since light in a single-mode waveguide has a well defined guide wavelength, single-mode waveguides allow the use of long gratings and directional coupler structures that rely on a well-defined guide wavelength and field distribution. Hence a remakeable, single-mode, multi-waveguide connector that allowed loose mechanical tolerances would be a significant advance in optical interconnection technology.

SUMMARY OF THE INVENTION

The present invention provides an apparatus and method for making multiple remakeable single-mode waveguide connections. When two suitably-designed waveguides are crossed at an angle, there will be a stress concentration in the region where the cores cross. If some portions of the waveguides are soft, they will deform the most at the place where the cores of the waveguides cross. The present invention relies on the physical deformation of soft parts of the cladding in the stress concentration zone to cause coupling to occur between the cores, without unacceptable loss elsewhere in the waveguide.

In accordance with a first aspect of the invention, the coupling is produced by physical proximity of the cores of the deformed waveguides, which causes their mode fields to overlap, resulting in directional coupling similar to that in a fused-fiber coupler.

In accordance with a second aspect of the invention, the coupling is produced by a grating structure in each waveguide, formed in a harder cladding region surrounding an inner soft cladding, the combined action of which is to couple light out of one waveguide and into the other.

In accordance with a third aspect of the invention, a grating structure in the hard cladding region couples light from a laser source into the waveguide through the side of the waveguide.

In accordance with a fourth aspect of the invention, a grating structure in the hard cladding region couples light from the guided mode out into one or more photodiodes through the side of the waveguide.

In accordance with a fifth aspect of the invention, a prism structure in the hard cladding region couples light from the guided mode out into a photo diode through the side of the waveguide.

In accordance with a sixth aspect of the invention, a remakeable waveguide connection is made by forming several waveguides into a ribbon, with spaces between them, crossing the ends of two such ribbons at a small angle and pressing them together so as to deform the soft cladding and initiate the coupling.

In accordance with a seventh aspect of the invention, the change in optical properties in the stressed region is made by a piezo-optical shift in the refractive index of a portion of the cladding, in addition to physical deformation, so that the decay length of the mode field in the cladding is increased sufficiently for interaction to take place between the mode field and a coupling structure, such as a second waveguide, a higher-index region, or a grating.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

In accordance with the invention, an as more fully described below, each waveguide is preferably a single-mode waveguide and comprises a core made from a hard polymer such as PMMA, polycarbonate, fluorinated polymers, benzocyclobutanes, epoxies such as SU-8, or cycloolefinic copolymers e.g. polynarbonene, or fluorinated polyimides. The core is surrounded by a cladding consisting of an inner soft layer made of an elastomer such as a silicone elastomer or silicone copolymer elastomers, and thin outer layer made from a higher modulus polymer sufficiently tough to recover from repeated deformation, e.g. polyimide, polynarbonene, cross-linked silicone, or fluorinated polymer such as fluorinated acrylic.

It is desirable that the hard outer cladding have a higher refractive index than the soft cladding, to allow a grating structure to be blazed appropriately to achieve directional selectivity. The hard outer cladding does not need to be of the same optical quality as the core or inner cladding, because it is illuminated only in the out-coupling region, which significantly broadens the possible choices of material.

Figure 1A:
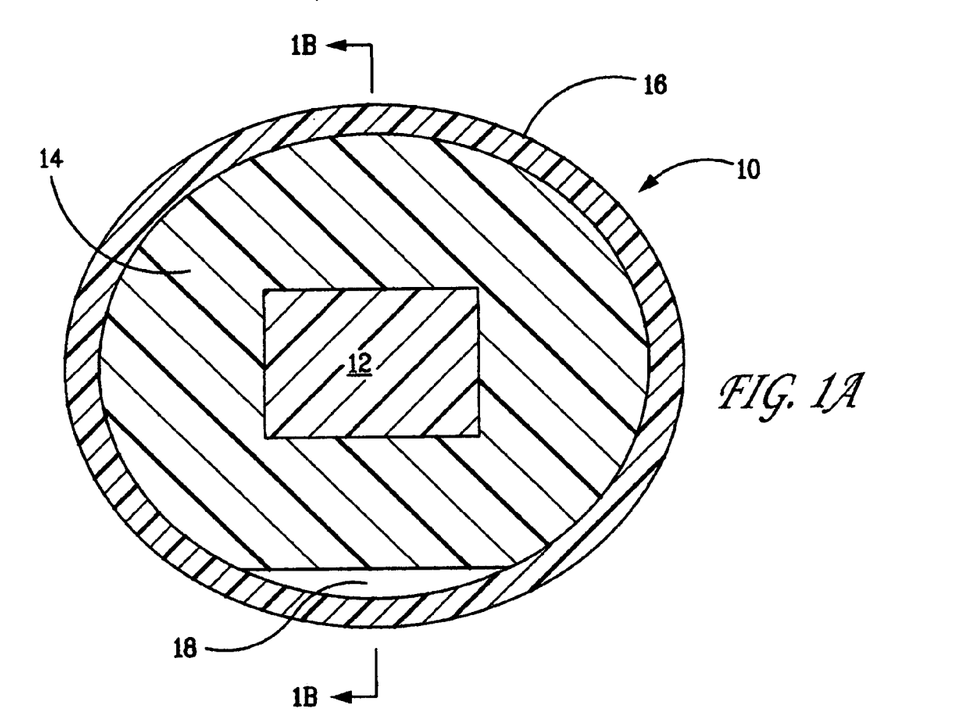
FIG. 1A is an enlarged cross-sectional view of an optical waveguide in accordance with the invention.
Figure 1B:
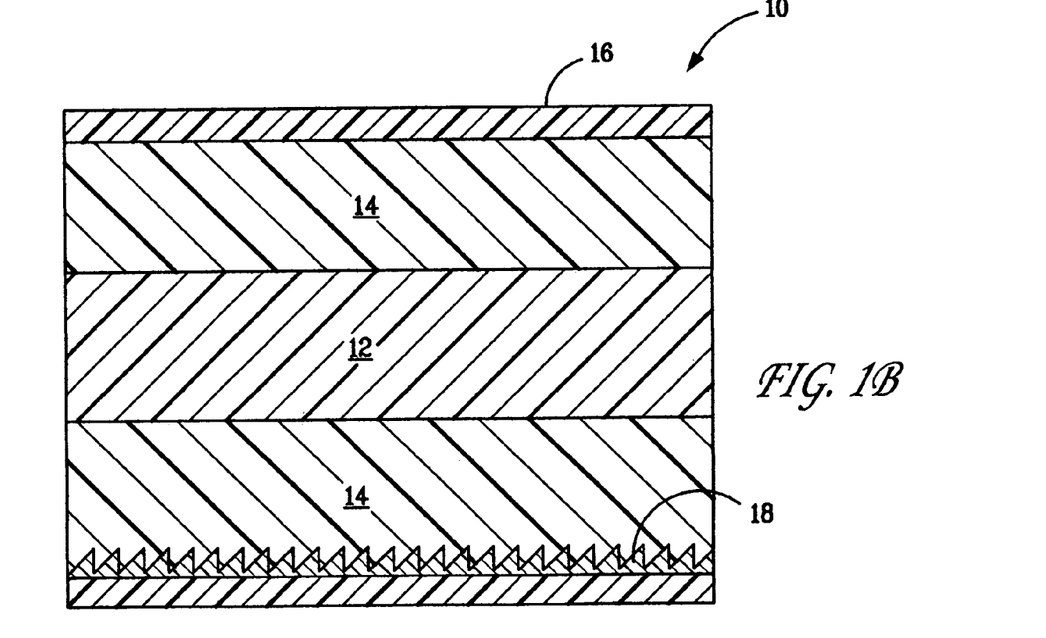
FIG. 1B is a cross-cross-sectional view of an optical waveguide in accordance with a first embodiment of the invention taken along line 1B-1B of FIG. 1A.

FIG. 1A and FIG., 1B show a polymer optical waveguide 10 comprising core region 12, surrounded by a soft cladding region 14 made from a compliant polymer, surrounded in turn by a hard cladding 16 made from a flexible polymer of higher modulus, as described above. A portion of the interface between the two cladding layers contains a grating structure 18, preferably on its inner surface. The spatial frequency of the grating 18 is selected to be the same as that of the guided mode. The thickness of the inner cladding is sufficient to keep the grating outside the mode field in undeformed regions of the waveguide, so that normally no out-coupling of the light results, and the waveguide propagation loss is comparable to that of other polymer waveguides, about 0.02-0.1 dB/cm.

Figure 2A:
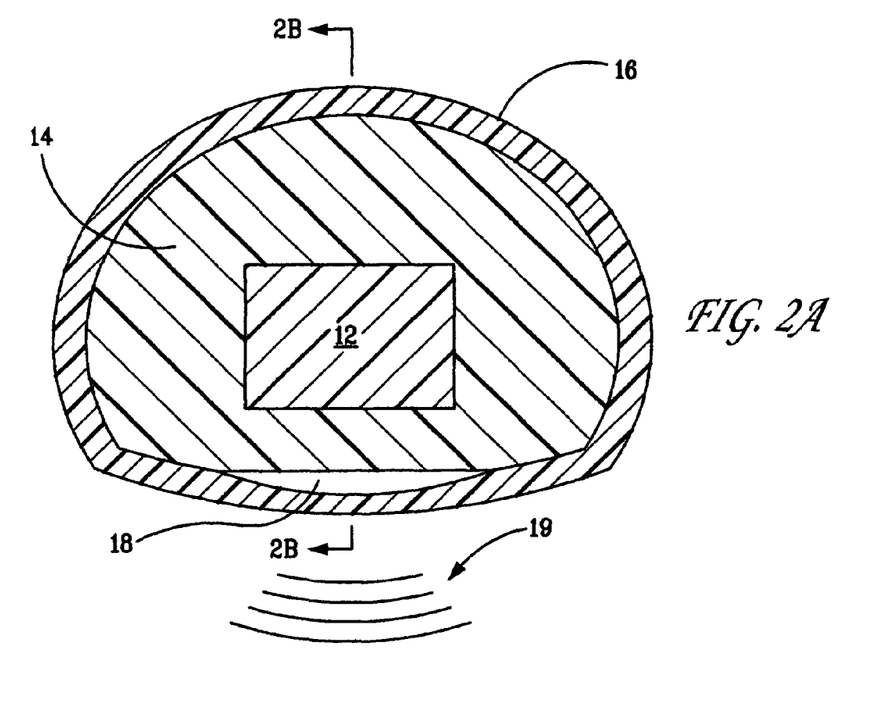
FIG. 2A and FIG. 2B are similar views of the same optical waveguide as in FIG. 1A and FIG. 1B when reversibly indented by a second matching waveguide.
Figure 2B:
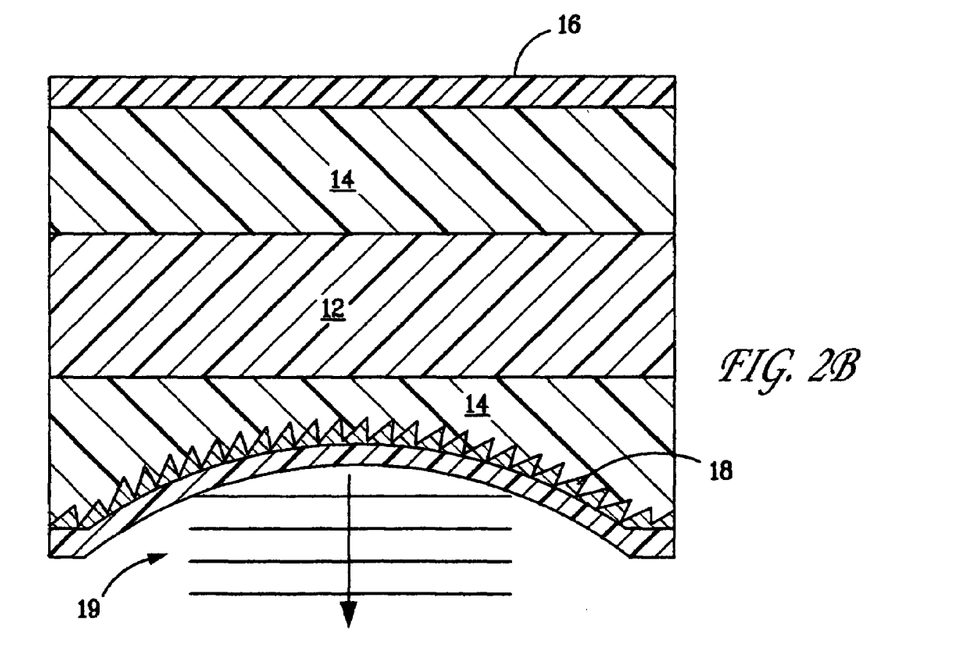

FIG. 2A and FIG. 2B show the same polymer optical waveguide after being reversibly indented by a second matching waveguide (not shown in these figures), crossing it at an angle. In the deformed region, the grating structure 18 has been forced closer to the core 12, leading to greatly enhanced out-coupling of the light in the waveguide, as shown at 19. As shown, the grating period is equal to the guide wavelength of the light, so that the peak of the angular spectrum of out-coupled light is nominally perpendicular to the axis of the waveguide.

Figure 3:
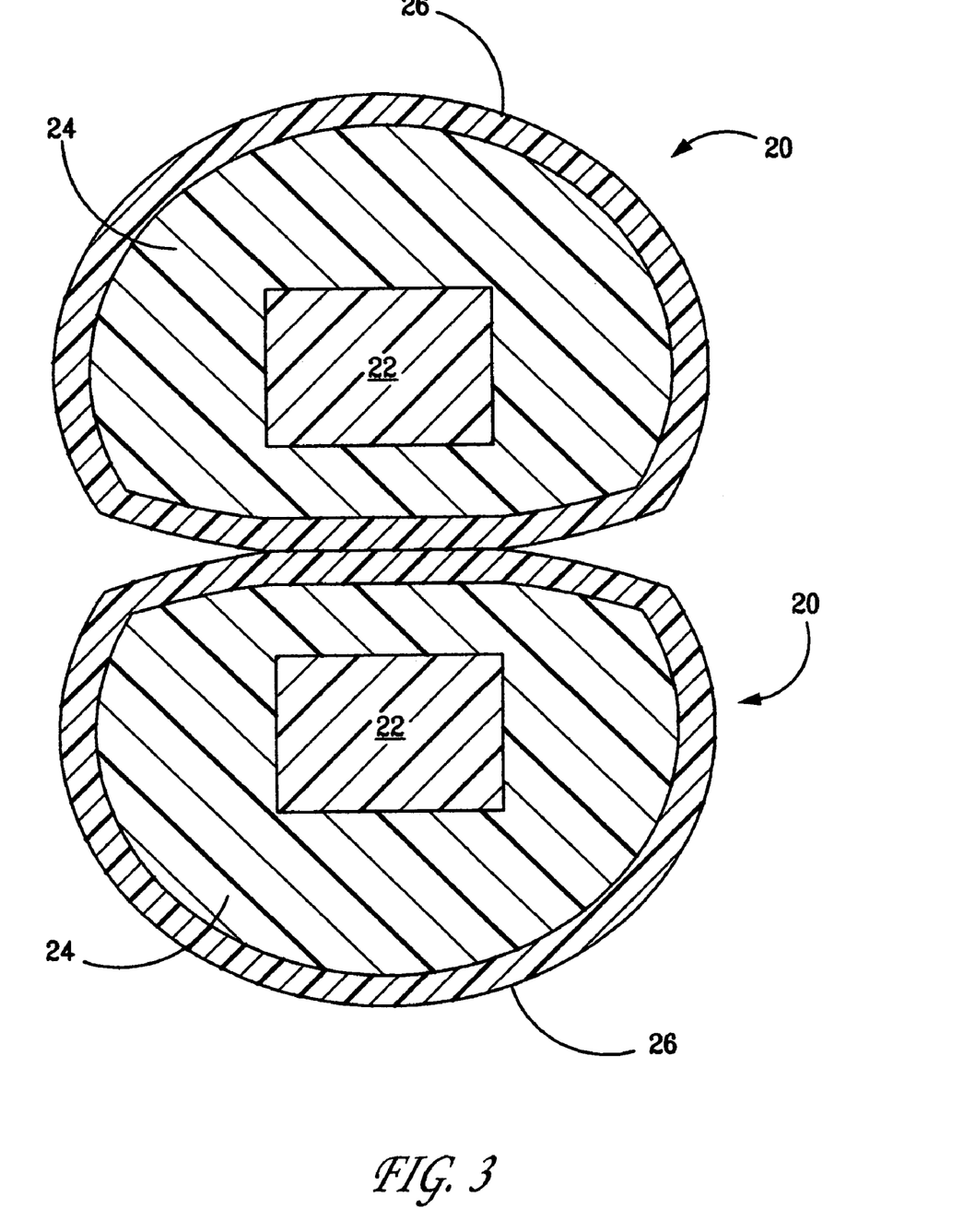
FIG. 3 is a cross-sectional view of two waveguides in accordance with a second embodiment of the invention pressed together.

FIG. 3 shows polymer waveguides 20 each comprising a core region 22, surrounded by an annular soft cladding 24 and a hard cladding layer 26, in a manner similar to FIG. 1A and FIG. 1B, but without a grating at the interface. Two waveguides are shown pressed together, with the result that the mode fields of their cores overlap, and directional coupling occurs between them.

Figure 4A:
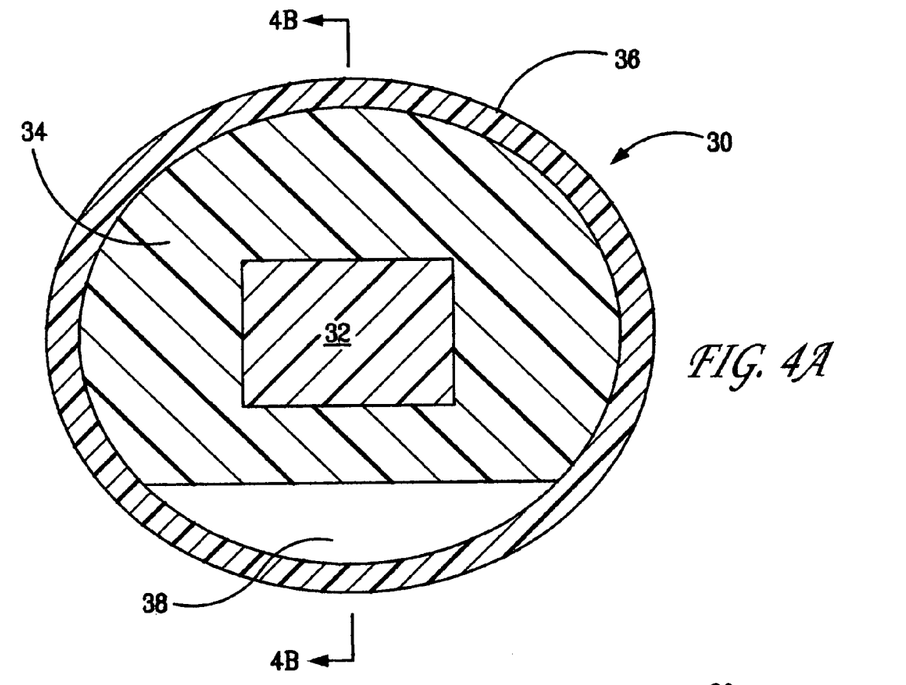
FIG. 4A is an enlarged cross-sectional view of an optical waveguide in accordance with a third embodiment of the invention.
Figure 4B:
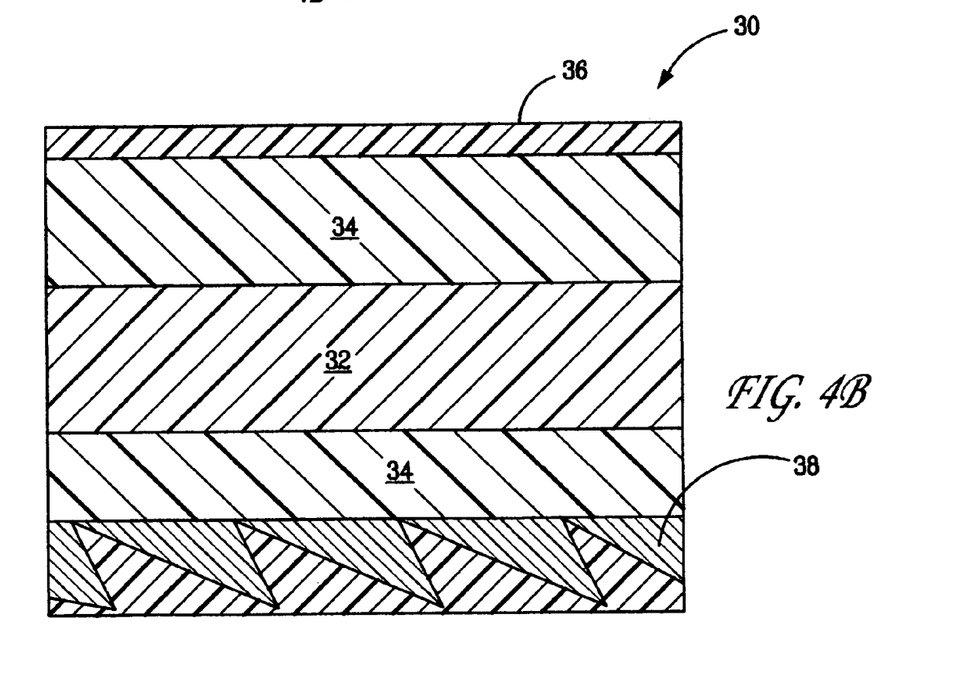
FIG. 4B is a cross-cross-sectional view of an optical waveguide in accordance with the invention taken along line 4B-4B of FIG. 4A.

FIG. 4A and FIG. 4B show a polymer waveguide 30 consisting of a core region 32, surrounded by an annular soft cladding layer 34 and a hard cladding layer 36 in a manner similar to FIG. 1A and FIG. 1B, but with a prism array 38 at the interface, instead of a grating. This allows the use of multimode waveguides, but requires that the material of the prism array 38 have a refractive index higher than that of the soft cladding 34. In FIG. 4A and FIG. 4B it is shown in a configuration suitable for a prism index greater than either of the soft or hard cladding materials.

Figure 5:
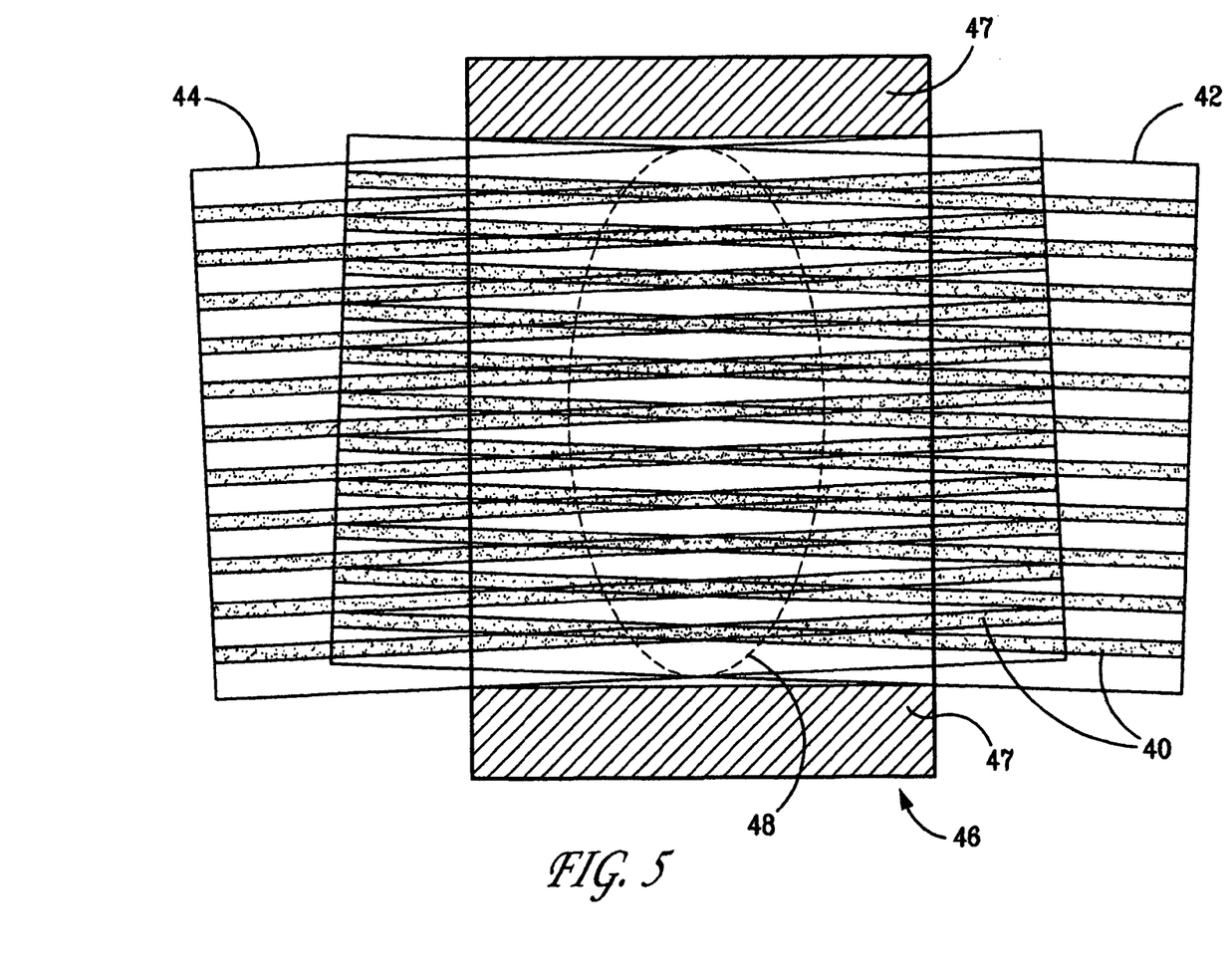
FIG. 5 is a plan view of a remakeable waveguide ribbon connector in accordance with the invention.

FIG. 5 shows a remakeable waveguide ribbon connection designed for connecting two ribbons 42 and 44 each comprising several parallel soft-cladding waveguides 40 spaced apart slightly, and crossed at a slight angle, in the range of 0.5 to 2.0 degrees, depending on the strength of the coupling per unit length. The two waveguides are pressed together by a clamp 46, which is a flexible planar carrier extending between the waveguides, which holds the waveguides in position, to form an interaction zone 48, and due to the self-aligning feature of the coupling, the alignment tolerance is equal to the full separation between waveguides. In a preferred embodiment of the invention, the waveguides in each array of waveguides are spaced from one another by a few times the diameter of the waveguides, and formed into a ribbon. The two ribbons are held in mechanical guides 47 to keep them in position and to relieve stress. It is desirable that there be some surface corrugations (as in ordinary wire ribbon cables), generally running parallel to the cores, along the length of the coupling surfaces of the waveguides, to allow the soft cladding somewhere to flow into as it deforms under stress.

Thus, mass connections are made by crossing two such ribbons at a slight angle, near their ends, and pressing them together with a clamp. The angle and interaction length are preferably chosen so that each individual waveguide crosses exactly one waveguide in the other ribbon. Because of the surface relief in the vicinity of the cores, the pressure results in compressing of the two waveguides, preferentially in the region where the two cores cross one another. This compressing brings the gratings into proximity with the cores in the crossing region, and coupling light out of the core of the illuminated waveguide. Because the grating period is the same as the guide wavelength, the peak of the angular spectrum of the out-coupled light travels substantially normal to the plane of the ribbon, and since the waveguides are compressed to their thinnest in the direction joining the two cores, the out-coupling is greatest where the cores overlap. Thus the in-coupling grating phase matches the out-coupled light into the grating of the receiving waveguide, and the result is a self-aligning optical connection. The out-coupled light propagates normal to the waveguide axis. Thus, errors in the crossing angle cause little change in efficiency. The connection is remakeable, because the cladding system is sufficiently resilient to recover after deformation.

Figure 6:
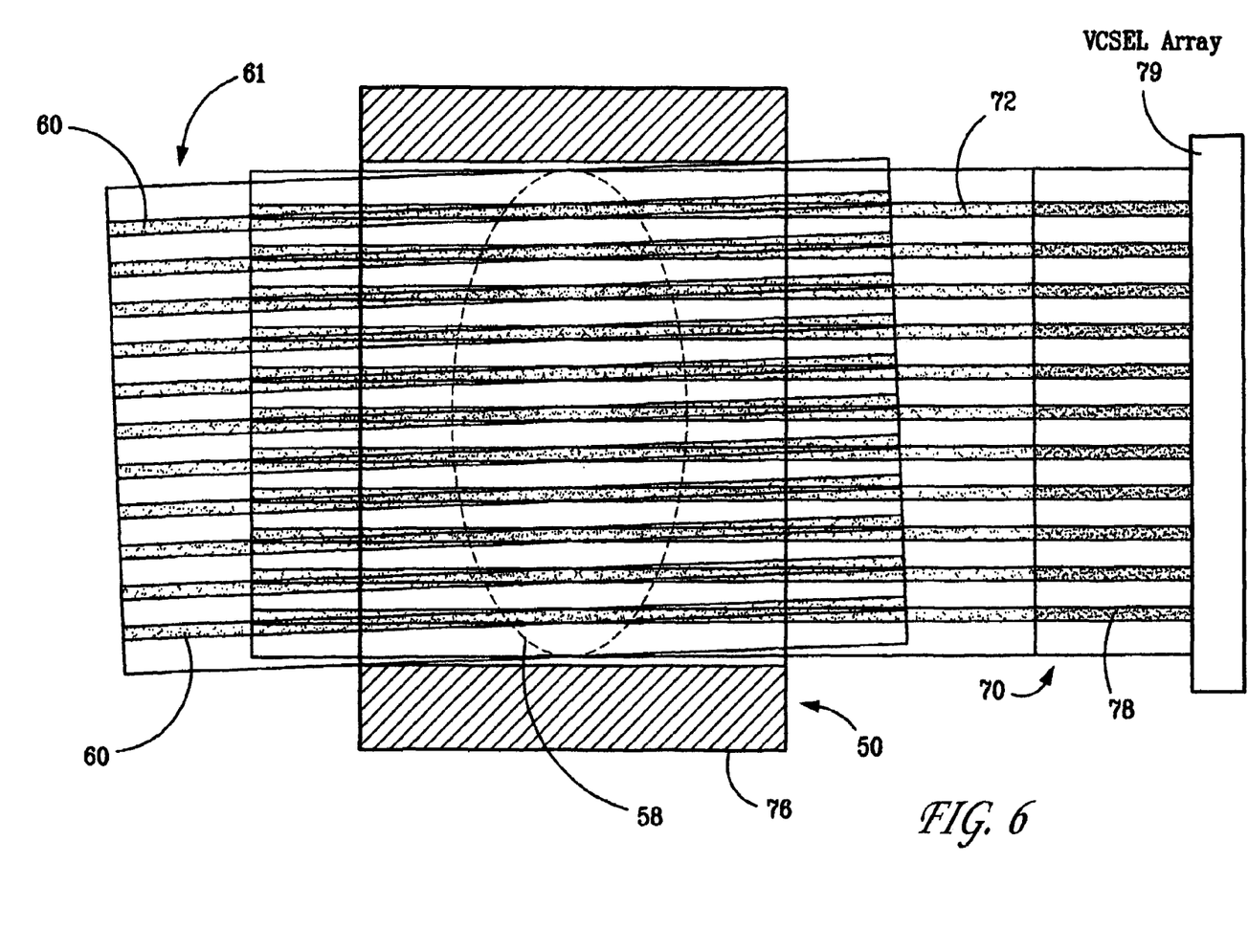
FIG. 6 is a plan view of a remakeable parallel optical link in accordance with the invention.

FIG. 6 shows one end of a remakeable parallel optical link 50 based on these waveguides. Here a region near the end of each of compliant waveguides 60 of a waveguide ribbon 61 is clamped against a launcher 70, by a clamp 76. The launcher 70 has waveguides 72 with similar properties to the compliant waveguides 60, but having one end where the soft cladding is replaced by a harder one 78, so that the location of the waveguide cores is accurately known. Thus, the modulus of the cladding is a function of position along the waveguides. The hardened ends are used to end-fire couple to an array 79 of Vertical Cavity Surface Emitting Lasers (VCSELs) at one end of the link, as shown, and an array of photo diodes at the other (not shown). VCSELs are preferred sources for optical links because they are available in monolithic arrays with lithographically defined spacings, but other structures known in the art, e.g. free space grating couplers or individually mounted lasers or detectors are also suitable.

Figure 7:
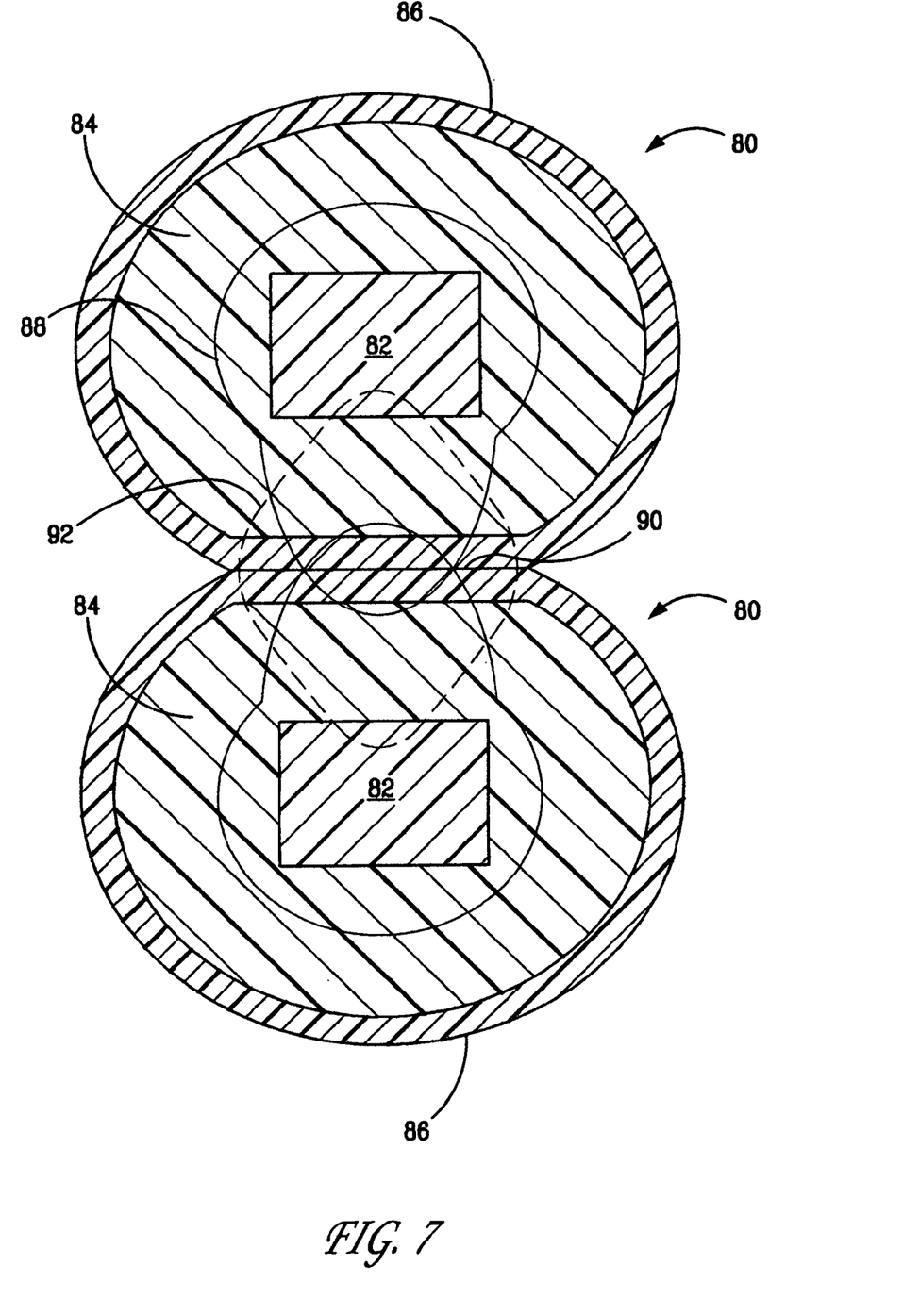
FIG. 7 is a cross-sectional view of two waveguides in accordance with a fourth embodiment of the invention, pressed together.

FIG. 7 shows a pair of guides 80, having cores 82, and using an inner cladding 84 made from a polymer with a high piezo-optical (or stress-optical) coefficient, such as a polybutadiene, a poly(styrene- b-butadiene, a silicone, or a polyisoprene; and a hard outer cladding 86. In the compressed region, the refractive indices of the inner cladding 84 increase significantly, because stressed material is usually optically anisotropic (more than one index is needed to describe it). This piezo-optic shift makes the core and inner cladding indices much closer in value, so that the decay constant is reduced and the 1/e contour of the mode field 88 extends far enough into the cladding to interact with the other waveguide, and result in the efficient coupling of light from one waveguide to the other. There is a flattening of the waveguides 80 along their circumferences, where contact is made at 90. A small amount of coupling gel may be used to assure good optical coupling between waveguides 80. The stressed region is approximately defined by dotted line 92.

The piezo-optical shift should be a significant fraction of the core-cladding refractive index difference in order for the mode-field diameter in the coupling region to be increased sufficiently for efficient coupling to occur. Thus, the piezo-optical cladding should have a high enough piezo-optical coefficient so that its index shifts sufficiently at a pressure small enough not to cause permanent deformation. Typically the piezo-optical shift is in the order of only one to two percent.

The piezo-optical effect can also be used to couple the core to a grating structure in the cladding, in a manner similar to that described above.

Although the description of the invention set forth above has referred to light and to optical elements, it will be understood by those skilled in the art that the invention is not limited to operating with visible light. With dimensions suitably chosen for the wavelength and refractive indices, the present invention can be used at any wavelength at which sufficiently transparent materials having suitable mechanical properties exist. This range extends at least from extremely high radio frequencies through the near ultraviolet.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

The invention claimed is:

1. A waveguide ribbon, comprising:
   a plurality of waveguides arranged in an array, each waveguide comprising a core;
   a deformable cladding layer surrounding the cores, for allowing thickness of the cladding to be altered by applying stress to the waveguide;
   a grating structure in the cladding; and
   a flexible planar carrier for the waveguides, for holding the waveguides in position.

2. The waveguide ribbon of claim 1, wherein the array is a linear array.

3. The waveguide ribbon of claim 1, in which a coupling surface of the deformable cladding has corrugations running parallel to the cores, allowing space for the deformable cladding to flow into when local pressure is applied.

4. A method for coupling a waveguide mode with unguided propagation, comprising:
   providing a waveguide, the waveguide having a core; and a deformable cladding layer surrounding the core, for allowing thickness of the cladding to be altered by applying stress to the waveguide, the cladding having a grating structure therein;
   providing an optical surface; and
   pressing a portion of said waveguide against said optical surface so that the deformable cladding layer is thinned in a region of highest pressure, causing a mode of the waveguide to be coupled into free propagation.

5. A method for coupling light between optical waveguide ribbons, comprising:
   providing first and second ribbons, each optical ribbon including a plurality of waveguides arranged in an array, each waveguide comprising a core; a deformable cladding layer surrounding the core, for allowing thickness of the cladding to be altered by applying stress to the waveguide, the cladding having a grating structure therein; and a flexible planar carrier for the waveguides, for holding the waveguides in position;
   placing the ribbons against one another so that they cross one another at an angle; and
   pressing the ribbons together so that the deformable claddings are thinned in regions where the cores cross, causing a mode of each waveguide in the first ribbon to be coupled to a mode of a waveguide in the second ribbon.

6. The method as in claim 5, further comprising launching light into said mode of a waveguide in the first ribbon.

7. The method as in claim 5, in which each waveguide has a grating structure in the cladding.

8. The waveguide ribbon of claim 1, further comprising:

a resilient cladding layer surrounding the deformable cladding layer;

wherein the grating is disposed at a portion of an interface between the deformable cladding layer and the resilient cladding layer.

9. The method as in claim 4, wherein the waveguide further comprises:

a resilient cladding layer surrounding the deformable cladding layer; and wherein the grating is disposed at a portion of an interface between the deformable cladding layer and the resilient cladding layer.

10. The method as in claim 5, wherein the waveguide further comprises:

a resilient cladding layer surrounding the deformable cladding layer; and wherein the grating is disposed at a portion of an interface between the deformable cladding layer and the resilient cladding layer.

* * * * *